United States Patent
Kuo et al.

(10) Patent No.: US 12,455,363 B2
(45) Date of Patent: Oct. 28, 2025

(54) MULTIPLE-INPUT MULTIPLE-OUTPUT RADAR DEVICE AND METHOD FOR SCANNING AT LEAST ONE MOVING OBJECT AND ESTIMATING PROBABILITY OF THE OBJECT IN 3D SURROUNDING SPACE

(71) Applicant: NEXTPERT INC., New Taipei (TW)

(72) Inventors: Wen-Yi Kuo, Taipei (TW); Li-Chun Wang, Taipei (TW); Yun-Ruei Lee, Taipei (TW); Yi-Lin Lee, Taipei (TW); Cheng-Feng Yeh, New Taipei (TW)

(73) Assignee: NEXTPERT INC., New Taipei (TW)

( * ) Notice: Subject to any disclaimer, the term of this patent is extended or adjusted under 35 U.S.C. 154(b) by 393 days.

(21) Appl. No.: 18/092,076

(22) Filed: Dec. 30, 2022

(65) Prior Publication Data

US 2024/0219553 A1    Jul. 4, 2024

(51) Int. Cl.
| | |
|---|---|
| *G01S 13/42* | (2006.01) |
| *G01S 7/35* | (2006.01) |
| *G01S 13/00* | (2006.01) |
| *G01S 13/02* | (2006.01) |
| *G01S 13/34* | (2006.01) |

(52) U.S. Cl.
CPC ............ *G01S 13/426* (2013.01); *G01S 7/352* (2013.01); *G01S 13/0209* (2013.01); *G01S 13/003* (2013.01); *G01S 13/346* (2013.01); *G01S 13/42* (2013.01)

(58) Field of Classification Search
CPC .... G01S 13/426; G01S 7/352; G01S 13/0209; G01S 13/003; G01S 13/346; G01S 13/42
See application file for complete search history.

(56) References Cited

U.S. PATENT DOCUMENTS

| | | | |
|---|---|---|---|
| 11,448,754 B2 | 9/2022 | Cattle et al. | |
| 2014/0348219 A1* | 11/2014 | Ishii | H04L 27/0002 375/240 |
| 2019/0302224 A1* | 10/2019 | Bordes | G01S 7/0232 |
| 2021/0028826 A1 | 1/2021 | Takahashi et al. | |
| 2023/0047968 A1* | 2/2023 | Jácome Muñoz | G01S 13/42 |
| 2023/0059523 A1* | 2/2023 | Cattle | G01S 13/345 |

FOREIGN PATENT DOCUMENTS

WO     WO-03079046 A1 *   9/2003    .......... G01S 13/524

* cited by examiner

*Primary Examiner* — William Kelleher
*Assistant Examiner* — Ismaaeel A. Siddiquee
(74) *Attorney, Agent, or Firm* — ScienBiziP, P.C.

(57) ABSTRACT

A multiple-input multiple-output (MIMO) radar device for scanning at least one moving object in space, comprising a transmitting antenna array having a plurality of transmitters, a receiving antenna array having a plurality of receivers, and a processor. The transmitters transmit electromagnetic wave signals with predetermined timing delays to the moving object, the electromagnetic wave signals are configured with random sequences. The receivers receive the electromagnetic wave signals reflected by the moving object, each receiver includes a plurality of matched filters corresponding to the plurality of transmitters, each matched filter obtains the electromagnetic wave signals with the predetermined timing delays from a corresponding transmitter and outputting a value. The processor accumulating the value outputted by each matched filter of each receiver and calculating a 3D cubic aggregate result for showing an existence probability of the at least one moving object in space.

16 Claims, 8 Drawing Sheets

MULTIPLE-INPUT MULTIPLE-OUTPUT RADAR DEVICE AND METHOD FOR SCANNING AT LEAST ONE MOVING OBJECT AND ESTIMATING PROBABILITY OF THE OBJECT IN 3D SURROUNDING SPACE

FIELD

The subject matter herein generally relates to wireless communication technology, and particularly to a multiple-input multiple-output (MIMO) radar device for scanning at least one moving object in a 3D surrounding space and a method for scanning the at least one moving object in the 3D surrounding space using a random sequence MIMO radar array.

BACKGROUND

High resolution 3D-scan or 4D-scan with speed estimation can take place by using technologies such as Lidars and cameras. However, both solutions are subject to weather conditions and the Lidar can be high cost. Additionally, due to analog or digital type of modulations used in these utilization, only low resolution has been achieve. Furthermore, as more vehicles, such as cars, employ traditional radars, these may suffer interference from other radars in adjacent cars and high resolution is difficult to achieve. This invention provides a digital modulation method used in radars to improve shortages of analog modulation of traditional radars.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
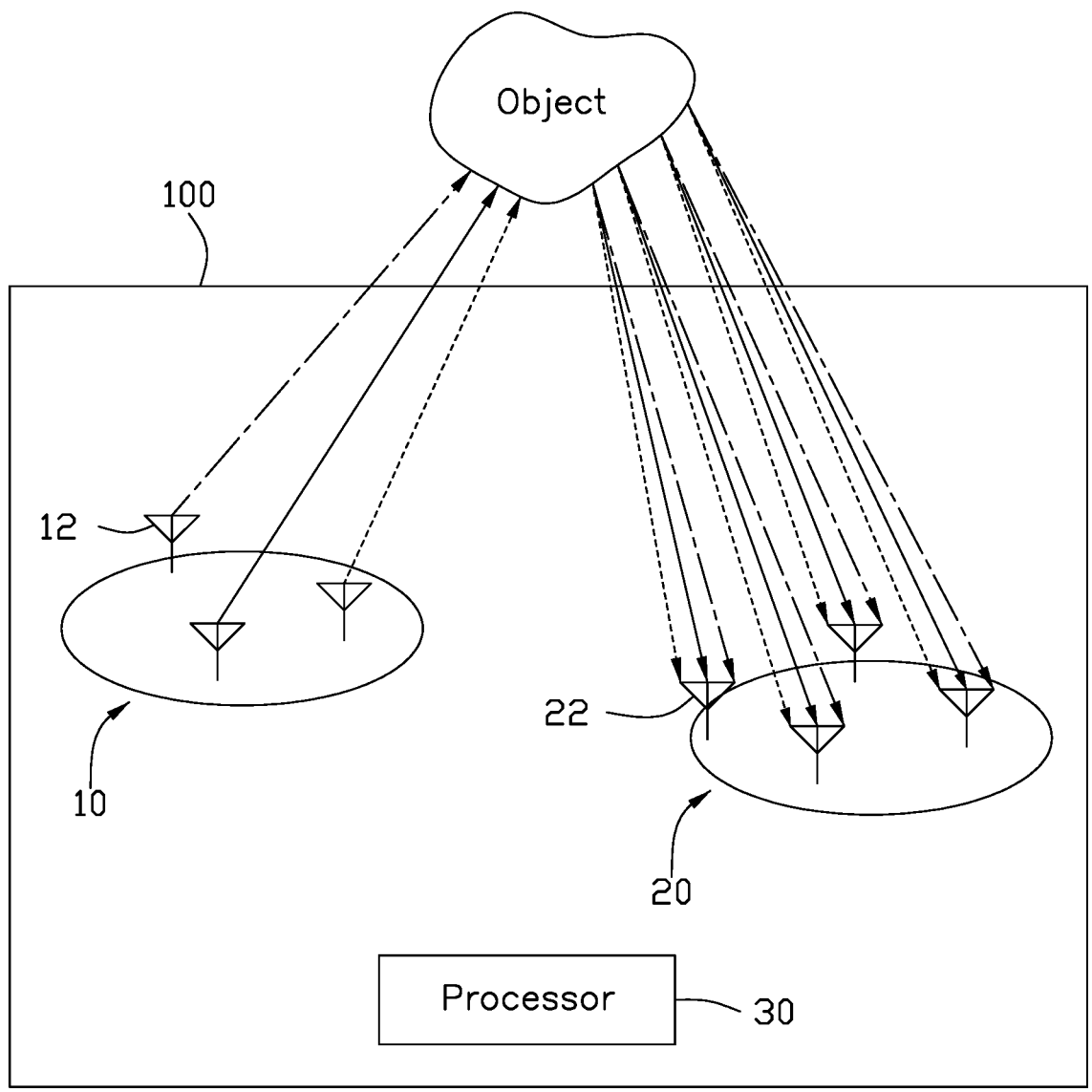
FIG. 1 illustrates a schematic view of one embodiment of a multiple-input multiple-output (MIMO) radar device for scanning a moving object in space.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to"; it in detail indicates open-ended inclusion or membership in a so-described combination, group, series, and the like.

FIG. 1 illustrates a multiple-input multiple-output (MIMO) radar device 100 for scanning at least one moving object in a 3D surrounding space and estimating a probability of the at least one moving object existing in the 3D surrounding space. The at least one moving object may be one moving object or a plurality of moving objects in the 3D surrounding space. In one embodiment, the device 100 can be used in autonomous drive, robots, space measurement or exploration for indoor, underground, and tunnels, etc. In another embodiment, the device 100 can be arranged in a vehicle, such as, a car, for further description.

The device 100 includes a transmitting antenna array 10, a receiving antenna array 20, and at least one processor 30.

The transmitting antenna array 10 includes a plurality of transmitters 12 configured to transmit electromagnetic wave signals with predetermined timing delays to in the 3D surrounding space. The electromagnetic wave signals transmitted by the transmitters 12 are intended to be reflected by at least one moving object in the 3D surrounding space.

The receiving antenna array 20 includes a plurality of receivers 22 configured to receive the electromagnetic wave signals reflected by the at least one moving object, and obtain the electromagnetic wave signals with the predetermined timing delays from corresponding transmitters 12 and output values.

In one embodiment, each of the transmitters 12 can transmit electromagnetic wave signals with predetermined timing delays to the at least one moving object in the 3D surrounding space, each of the receiver 22 can receive the electromagnetic wave signals of each of the transmitters 12 that reflected by the at least one moving object. In another embodiment, each of the transmitters 12 can transmit electromagnetic wave signals with predetermined timing delays to some moving objects in the 3D surrounding space, each of the receivers 22 can receive the electromagnetic wave signals of each of the transmitters 12 reflected by the some moving objects.

The at least one processor 30 is electrically coupled to the transmitting antenna array 10 and the receiving antenna array 20. The at least one processor 30 is configured to aggregate the values outputted by the receivers 22 and calculate a 3D cubic aggregate result for showing the probability of the at least one moving object existing in 3D surrounding space.

In one embodiment, the transmitters 12 can be transmitting antennas or transmitting radars; the receivers 22 can be receiving antennas or receiving radars. The transmitters 12 and the receivers 22 can be located at relative known positions, such as front position or a roof position of the vehicle. In one embodiment, the transmitters 12 and the receivers 22 can be arranged at a windshield of a car for example, for scanning at least one moving object in front of the car. In one embodiment, the transmitters 12 and the receivers 22 can be microwave radars, the electromagnetic wave signals can be microwave signals generated and transmitted by the microwave radars.

In one embodiment, the device 100 may include M number (M is a positive integer that is equal or greater than 2) of transmitters 12 and N number (N is a positive integer that is equal or greater than 2) of receivers 22, the m transmitters 12 and the n receivers 22 can form a M*N antenna array or radar array. In at least one embodiment, the M transmitters 12 may be TX 1 (transmitter 1), TX 2, . . . , TX m, . . . , TX M. The N receivers 22 may be RX 1 (receiver 1), RX 2, . . . , RX n, . . . , RX N. Each of M and N is a positive integer that is equal or greater than 2, m is any positive integer that between 1 and M, n is any positive integer that between 1 and N.

Figure 2:
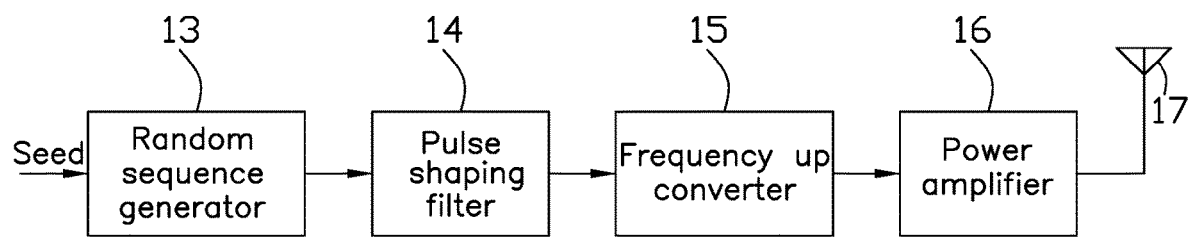
FIG. 2 illustrates a schematic view of one embodiment of a transmitter of the device shown in FIG. 1.

Referring to FIGS. 1 and 2, each of the transmitters 12 may include a random sequence generator 13, a pulse shaping filter 14, a frequency up converter 15, a power amplifier 16, and a transmitting antenna 17. The random sequence generator 13, the pulse shaping filter 14, the frequency up converter 15, the power amplifier 16, and the transmitting antenna 17 are electrically connected in series.

The random sequence generator 13 is configured to generate baseband signals with unique random sequences. In one embodiment, the random sequence generator 13 generates the baseband signals with the unique random sequences based on seed. The seed may be chosen uniquely different for the transmitter 12 among all the transmitters 12, so the unique random sequences generated at different transmitters 12 can be uncorrelated and unique. In another embodiment, the seed may take values from some random properties of a hardware of the device 100 or take values from a hash function through operation on some unique hardware identifier, system clock, transmitter identifier, etc. In another embodiment, each of the baseband signals with the unique random sequences is in a quasi unique and orthogonal form. Synchronously, each of the transmitters 12 synchronizes the unique random sequence to the receivers 22 in the device 100. Thus, each of the receivers 22 in the device 100 can receive the unique random sequence from each of the transmitters 12 and identify electromagnetic wave signals transmitted by each of the transmitters 12 according to the unique random sequence.

The pulse shaping filter 14 is configured to shape the baseband signals with the unique random sequences generated by the random sequence generator 13 and obtain shaped signals within a predetermined bandwidth. In one embodiment, the baseband signals with the unique random sequences generated by the random sequence generator 13 can be shaped from orthogonal to sine wave.

The frequency up converter 15 is configured to modulate a carrier frequency of the shaped baseband signals to obtain conversed signals within a desired radio frequency (RF) band. In one embodiment, the shaped baseband signals within the predetermined bandwidth shaped by the pulse shaping filter 14 are modulated to obtain the conversed signals within the desired RF band, for improving transmission efficiency.

The power amplifier 16 is configured to amplify the conversed signals and generate the electromagnetic wave signals for being transmitted out of the transmitting antenna 17.

The transmitting antenna 17 is configured to transmit the electromagnetic wave signals.

Figure 3:
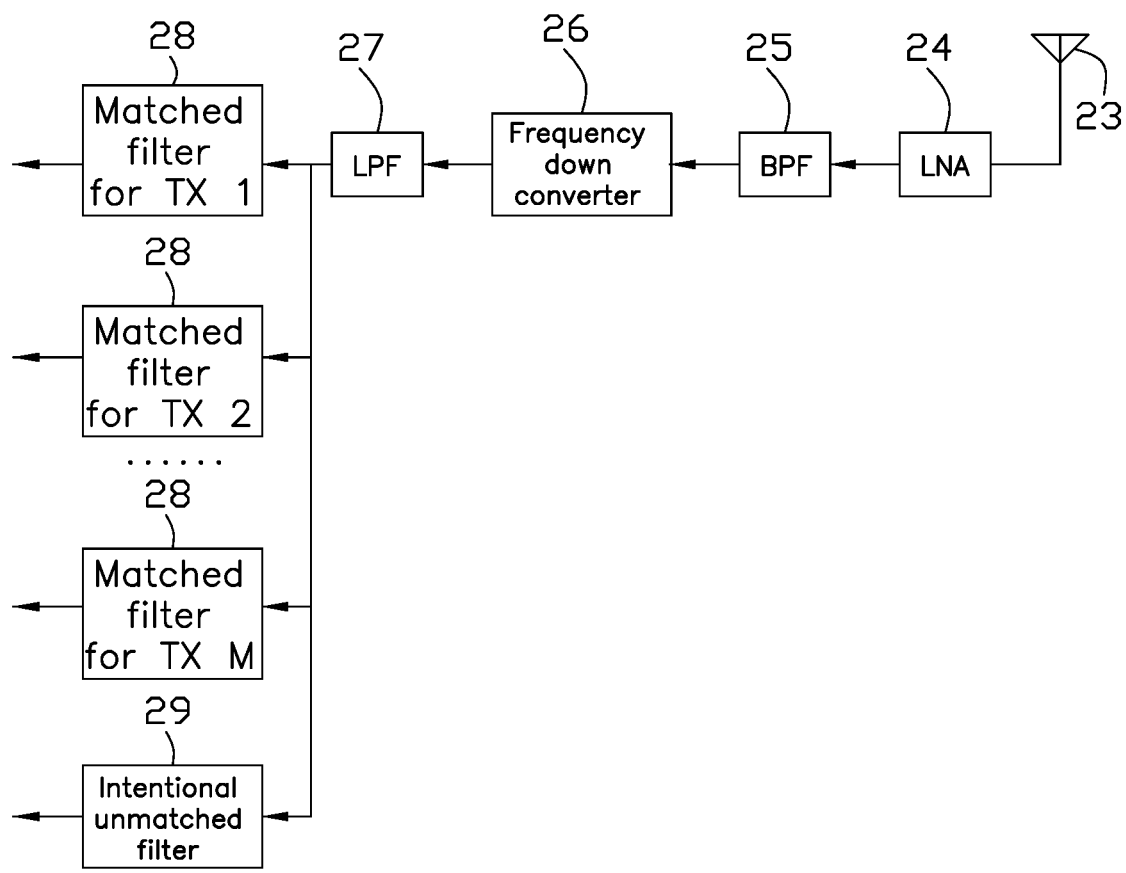
FIG. 3 illustrates a schematic view of one embodiment of a receiver of the device shown in FIG. 1.

Referring to FIGS. 1 and 3, each of the receiver 22 may include a receiving antenna 23, a low noise amplifier (LNA) 24, a base pass filter (BPF) 25, a frequency down converter 26, a low pass filter (LPF) 27, a plurality of matched filters 28, and an intentional unmatched filter 29. The receiving antenna 23, the LNA 24, the BPF 25, the frequency down converter 26, the LPF 27, the plurality of matched filters 28 are electrically connected in series, the plurality of matched filters 28 and the intentional unmatched filter 29 are electrically connected in parallel.

The receiving antenna 23 is configured to receive the electromagnetic wave signals reflected by the at least one moving object.

The LNA 24 is configured to amplify the electromagnetic wave signals received from the receiving antenna 23.

The BPF 25 is configured to filter out unwanted interference outside a desired RF band from the electromagnetic wave signals.

The frequency down converter 26 is configured to demodulate the electromagnetic wave signals within the desired RF band to obtain the baseband signals with the unique random sequences.

The LPF 27 is configured to filter out noise signals from the baseband signals and output the filtered baseband signals with the unique random sequences to the plurality of matched filters 28.

The plurality of matched filters 28 of each of the plurality of receivers 22 are corresponding to the plurality of transmitters 12. A number of the matched filters 28 in each of the receivers 22 is equal to a number of the transmitters 12. For instance, when the device 100 includes M number (M is a positive integer that is equal or greater than 2) of transmitters 12, each of the plurality of receivers 22 includes the same number (M number) of matched filters 28, each matched filters 28 is corresponding to one transmitter 12. In at least one embodiment, each of the plurality of receivers 22 includes the same number (M number) of matched filters 28, such as matched filter for TX 1, matched filter for TX 2, . . . , matched filter for TX m, . . . , and matched filter for TX M.

Figure 4A:
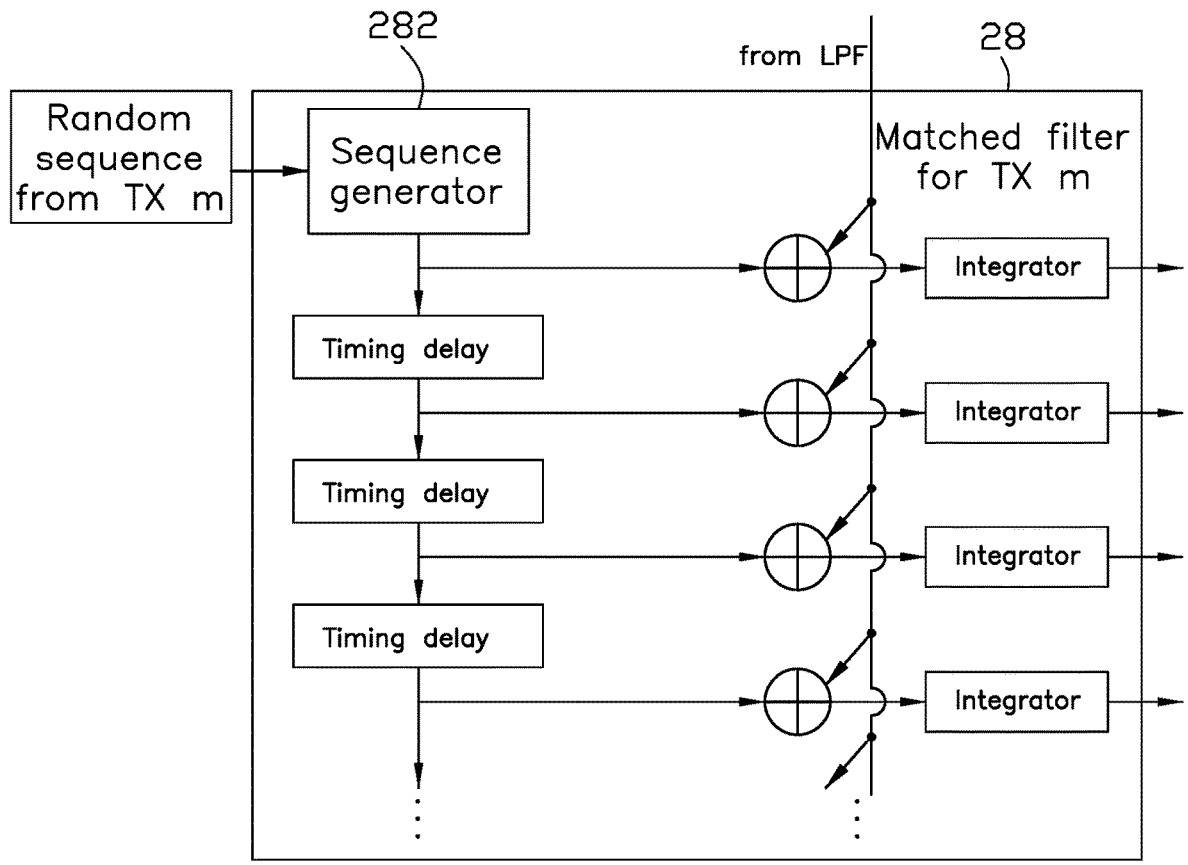
FIG. 4A illustrates a schematic view of one embodiment of a matched filter of the device.

Referring to FIGS. 1, 3, and 4A, each of the plurality of matched filters 28 of each of the plurality of receivers 22 is configured to obtain the electromagnetic wave signals with predetermined timing delays from the corresponding transmitter 12 and output a value. In one embodiment, for instance, the transmitters 12 keeps transmitting the electromagnetic wave signals to the 3D surrounding space, at least some of the electromagnetic wave signals are reflected by the moving object in the 3D surrounding space, one of the matched filters 28 can obtain the electromagnetic wave signals with the predetermined timing delays (which may mean that the matched filter 28 can obtain the electromagnetic wave signal by the predetermined timing delays, such as 100 milliseconds, 200 milliseconds, 500 milliseconds, etc. not being limited by the present disclosure) from the corresponding transmitter 12 (or a targeted transmitter 12), and block the other electromagnetic wave signals from other transmitters 12. After the matched filter 28 obtains the electromagnetic wave signals with the predetermined timing delays from the corresponding transmitter 12, the matched filter 28 outputs a value. In one embodiment, the matched filter 28 may output the value based on a characteristic of the electromagnetic wave signals, such as a signal strength, or spatial information of the electromagnetic wave signals. The value outputted by the matched filter 28 is positively related to the characteristic of the electromagnetic wave signals. In one embodiment, the value outputted by the matched filter 28 indicates a similarity between the received baseband signal and the unique random sequence transmitted from the corresponding transmitter 12 (or the targeted transmitter 12). The higher the value outputted by the matched filter 28, the more likely that the received baseband signal contains a reflected signal from the corresponding transmitter 12 (or the targeted transmitter 12).

In one embodiment, when the moving object is moving in the 3D surrounding space, the characteristics of the electromagnetic wave signals reflected by the at least one moving object in 3D surrounding space may be dynamically changed. In one embodiment, the spatial information may include distance, azimuth, elevation, and derived velocity. Thus, the values outputted by the matched filters 28 can be used for estimating the movement of the moving object.

In one embodiment, each of the matched filters 28 of each of the receivers 22 can output the value, thus, all the matched filters 28 of all the receivers 22 can output a plurality of values. For instance, the M (M is a positive integer that is equal or greater than 2) number of matched filters 28 of the N (N is a positive integer that is equal or greater than 2) number of receivers 22 can output M*N values.

In one embodiment, each of the matched filters 28 of each of the receivers 22 obtains the unique random sequence of the electromagnetic wave signals to identify the electromagnetic wave signals are from the corresponding transmitters 21.

Referring to FIG. 4A, each of the matched filters 28 may include a sequence generator 282 and a plurality of integrators. The sequence generator 282 may be configured for receiving the unique random sequence synchronized from each of the transmitters 12. At least one embodiment, the matched filter for TX m can receive the unique random sequence synchronized the corresponding transmitter m (TX m) and obtain the electromagnetic wave signals with predetermined timing delays transmitted from the corresponding transmitter m (TX m). The electromagnetic wave signals from the corresponding transmitter 12 are assigned by the predetermined timing delays and then transmitted to the integrators, and then the integrators output values. Each of the integrators may obtain electromagnetic wave signals according to different predetermined timing delays, thus, the electromagnetic wave signals in different predetermined timing delays can be individually obtained by individual integrator.

Figure 4B:
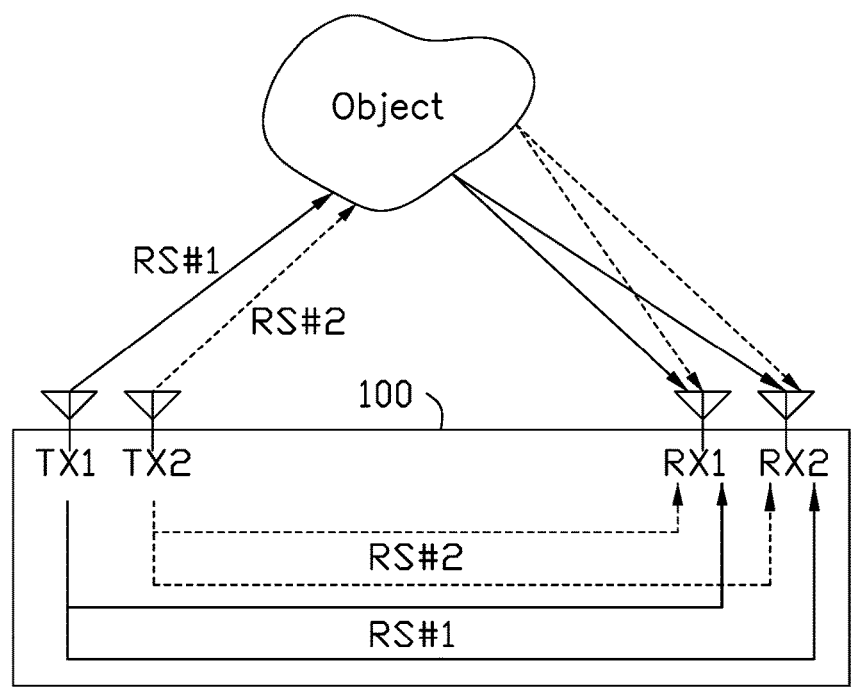
FIG. 4B illustrates a schematic view of one embodiment of a scene of the transmitters transmitting unique random sequences to the receivers.

Referring to FIG. 4B, in one embodiment, there are two transmitters, such as transmitter 1 (TX 1) and transmitter 2 (TX 2), and two receivers, such as receiver 1 (RX 1) and receiver 2 (RX 2) in the device 100. It should be known that, the device 100 may include M number of transmitters and N number of receivers as shown in FIG. 1, the two transmitters and two receivers in the device 100 as shown in FIG. 4B are set for example for description. The transmitter 1 (TX 1) can generate a first unique random sequence (RS #1) and synchronize the first unique random sequence (RS #1) to the receiver 1 (RX 1) and receiver 2 (RX 2) in the device 100. The transmitter 1 (TX 1) also transmits the electromagnetic wave signals containing the first unique random sequence (RS #1) to the 3D surrounding space. The matched filter for transmitter 1 (TX 1) in each of the receiver 1 (RX 1) and receiver 2 (RX 2) can obtain the first unique random sequence synchronized by the transmitter 1 (TX 1), so as to identify the received electromagnetic wave signals transmitted from transmitter 1 (TX 1) and reflected by the moving object in the 3D surrounding space. The transmitter 2 (TX 2) can generate a second unique random sequence (RS #2) and synchronize the second unique random sequence (RS #2) to the receiver 1 (RX 1) and receiver 2 (RX 2) in the device 100. The transmitter 2 (TX 2) also transmits the electromagnetic wave signals containing the second unique random sequence (RS #2) to the 3D surrounding space. The matched filter for The transmitter 2 (TX 2) in each of the receiver 1 (RX 1) and receiver 2 (RX 2) in the device 100 can obtain the second unique random sequence (RS #2) synchronized by the transmitter 2 (TX 2), so as to identify the received electromagnetic wave signals transmitted from the transmitter 2 (TX 2) and reflected by the moving object in the 3D surrounding space.

The intentional unmatched filter 29 is unmatched to the unique random sequences of any of the transmitters 12. The intentional unmatched filter 29 is configured to integrate an aggregated noise and interference level of the receiver 22. The noises and interference are not identified by any of the matched filters 28. The noises and interference may be obtained by the intentional unmatched filter 29, so the intentional unmatched filter 29 can measure and accumulate an aggregated noise and interference level along the signal path of each transmitter-receiver pair. In one embodiment, the higher aggregated noise and interference level of the receiver 22, the less weight in the calculated probability of the at least one moving object existing in the 3D surrounding space; the lower aggregated noise and interference level of the receiver 22, the greater weight in the calculated probability of the at least one moving object existing in the 3D surrounding space. For instance, if the aggregated noise and interference level of a first receiver 22 is higher than that of a second receiver 22, then the weight of the first receiver 22 in the calculated probability of the at least one moving object existing in the 3D surrounding space is less than that of the second receiver 22.

Figure 5:
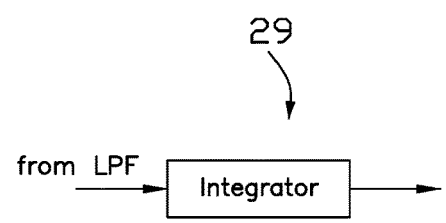
FIG. 5 illustrates a schematic view of one embodiment of an intentional unmatched filter of the device.

Referring to FIG. 5, one embodiment shows each of the intentional unmatched filters 29 can be an integrator for aggregating the noise and interferences of the electromagnetic wave signals received from the LPF 27.

Figure 6:
FIG. 6 illustrates a schematic view of one embodiment of a 3D cubic aggregate result outputted by the receivers.
Figure 7:
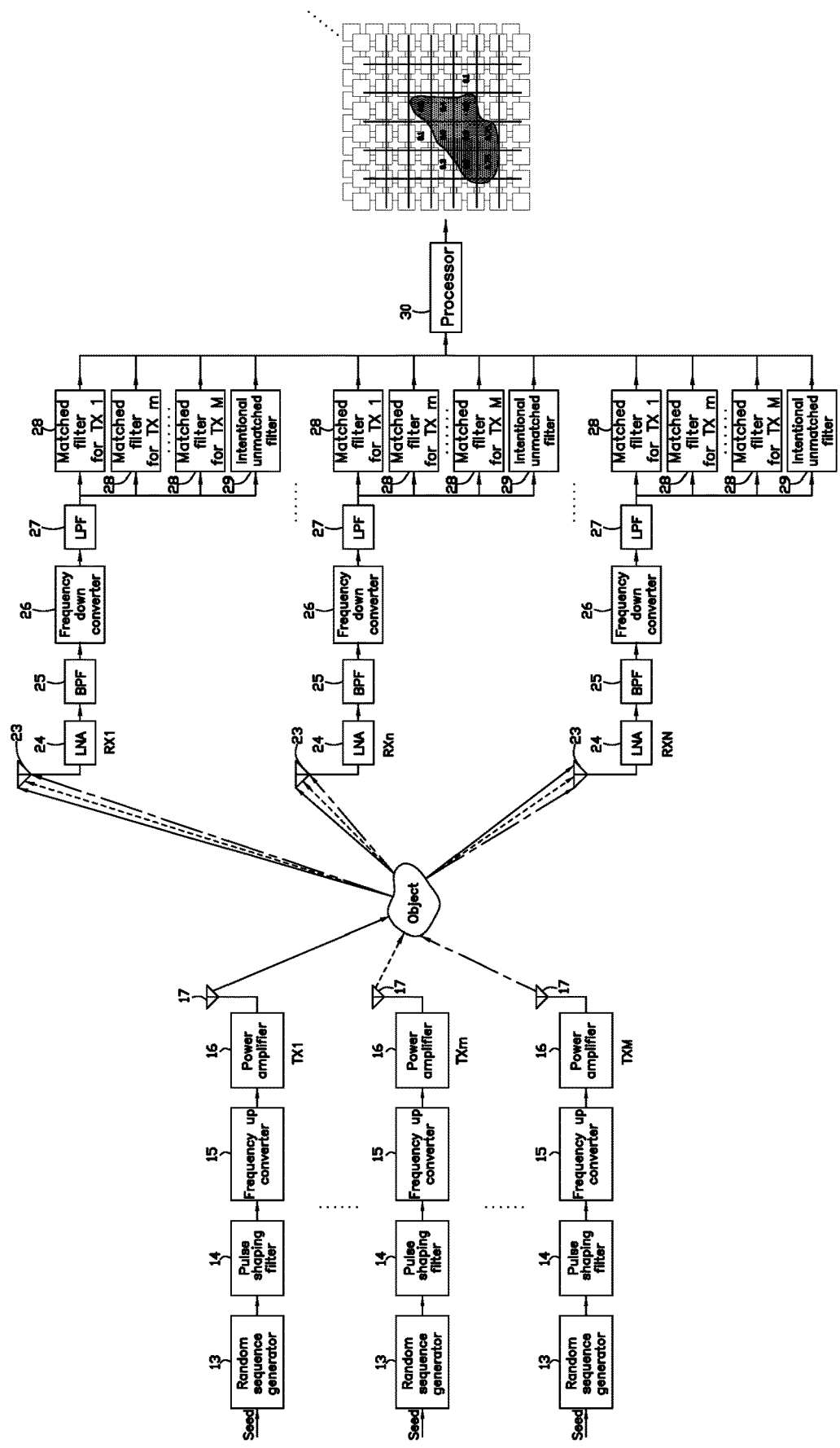
FIG. 7 illustrates another schematic view of one embodiment of the MIMO radar device for scanning at least one moving object in space.

FIG. 6 illustrates a schematic view of one embodiment of a 3D cubic aggregate result outputted by the receivers 22. In Addition, FIG. 7 illustrates another schematic view of one embodiment of the MIMO radar device for scanning at least one moving object in the 3D surrounding space. FIG. 7 is a full schematic view of FIG. 1~FIG. 6.

Referring to FIGS. 1, 6, and 7, the at least one processor 30 is configured to accumulate the values outputted by all the matched filters 28 of all the receivers 22 to calculate a 3D cubic aggregate result for showing a probability of the at least one moving object existing in the 3D surrounding space. In one embodiment, the 3D cubic aggregate result can be corresponded to the 3D surrounding space, the 3D cubic aggregate result may include a plurality of grids corresponding to smaller space units of the 3D surrounding space. Each of the grids is corresponding to one of the matched filters 28 of one of the receivers 22, each of the grids of the 3D cubic aggregate result includes the value outputted by the one of the matched filters 28 of one of the receivers 22. In one embodiment, the value of each grid of the 3D cubic aggregate may mean a signal power level for showing whether obtaining electromagnetic wave signals reflected by the at least one moving object. Thus, M*N values may be outputted by all the matched filters 28 of all the receivers 22 to form the grids of a planar aggregate result, M*N values with the predetermined timing delays outputted by all the matched filters 28 of all the receivers 22 can form all the grids of the 3D cubic aggregate result. Thus, values in the 3D cubic aggregate result may be used for showing an existence probability of the at least one moving object in the 3D surrounding space, and for being observed. As shown in FIG. 6, in one embodiment, the value of each of the grids of the 3D cubic aggregate result may be in 8 levels (3 digits) or 16 levels (4 digits) of the existence probability (from 0 to 1).

In another embodiment, the 3D surrounding space can be divided into a plurality of 3D cubes according to distance, vertical angle, and horizontal angle. The 3D cubes comprises values outputted by the plurality of matched filters 28.

In one embodiment, by combining the M*N values and the aggregate interference level of the noise, the lower the aggregate interference level of the noise, the better will be the performance of the scanning.

In one embodiment, each of the matched filter 28 is configured to detect whether there is at least one moving object exists in the 3D-cube (in the 3D surrounding space), which is designated by the predetermined timing delays. If the received baseband signal (after demodulation) is a reflected replica of the corresponding transmitted signal (with the unique random sequence and known predetermined time delay), then it is a clear evidence that there is at least one moving object in the 3D-cube. The larger value of the matched filter 28 output indicates the higher probability of the moving object existence in the 3D-cube.

In one embodiment, the at least one processor 30 can be formed by integrated circuits, such as an individual integrated circuit or multiple integrated circuits with a same function or different functions. The at least one processor 30 includes but is not limited to a central processing unit (CPU), a microprocessor, a digital signal processor (DSP), a graphics processor, an application specific integrated circuit (ASIC), a field-programmable gate array (FPGA), a data processor chip, a programmable logic device (PLD), a discrete gate/transistor logic device, or a discrete hardware component. The processor 30 may be a control unit and electrically connected to other elements of the device 100 through interfaces or a bus. In one embodiment, the various types of non-transitory computer-readable storage mediums stored in a memory of the device 100 can be processed by the at least one processor 30 to perform various of functions, such as the method for scanning a moving object in 3D surrounding space.

In one embodiment, a method for scanning at least one moving object in the 3D surrounding space using a MIMO radar device, such as the device 100 shown in FIG. 1. The functions may be integrated in the apparatus for the method for scanning at least one moving object in the 3D surrounding space. In another embodiment, the method for scanning at least one moving object in the 3D surrounding space can be run in a form of software development kit in the apparatus.

Figure 8:
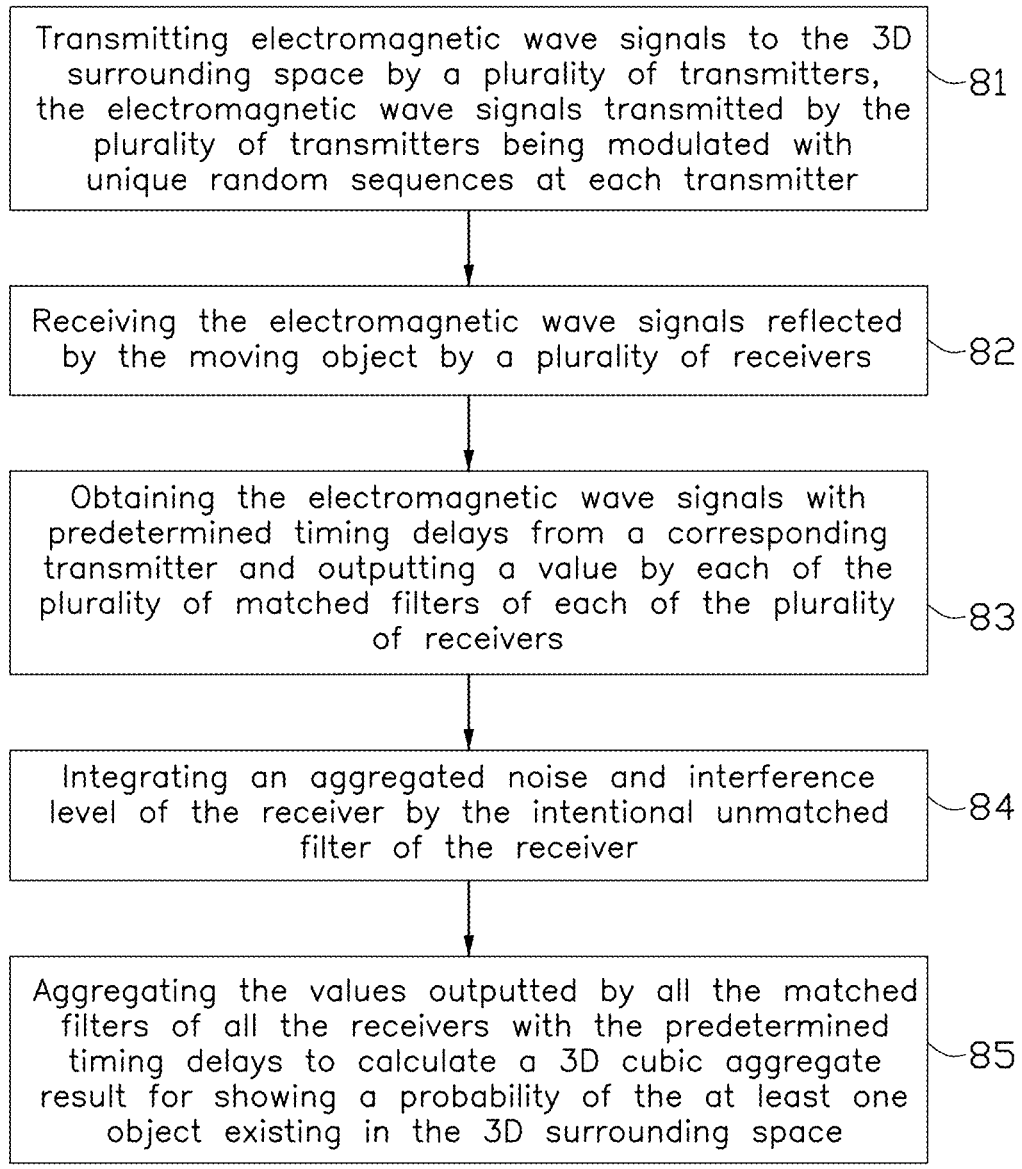
FIG. 8 is a flowchart of one embodiment of a method for scanning at least one moving object in space.

The method is provided by way of example, as there are a variety of ways to carry out the method. Each block shown in FIG. 8 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 81.

At block 81, transmitting electromagnetic wave signals to the 3D surrounding space by a plurality of transmitters 12, the electromagnetic wave signals transmitted by the plurality of transmitters 12 being modulated with unique random sequences at each transmitter 12.

In at least one embodiment, the transmitters may be the transmitters 12 of the device 100, when the electromagnetic wave signals transmitted by the plurality of transmitters 12 reach the at least one moving object in the 3D surrounding space, the electromagnetic wave signals may be reflected by the at least one moving object.

At block 82, receiving the electromagnetic wave signals reflected by the at least one moving object by a plurality of receivers 22 of the device 100.

At block 83, obtaining the electromagnetic wave signals with predetermined timing delays from a corresponding transmitter and outputting a value by each of the plurality of matched filters 28 of each of the plurality of receivers 22.

In one embodiment, each of the receivers includes the plurality of matched filters 28 corresponding to the plurality of transmitters 12. In one embodiment, each of the matched filters 28 of each of the receiver 22 can output the value, thus, all the matched filters 28 of all the receivers 22 can output a plurality of values, such as M*N values (when there are m matched filters 28 in each of n receivers 22, each of m and n is a positive integer that is equal or greater than 2).

At block 84, integrating an aggregated noise and interference level of the receiver by the intentional unmatched filter of the receiver 22.

In one embodiment, the noises, which are not obtained by any of the matched filters 28, will be obtained by the intentional unmatched filter 29, so the intentional unmatched filter 29 can measure and accumulate an aggregate interference level of the noise at each transmitter-receiver pair signal path.

At block 85, aggregating the values outputted by all the matched filters 28 of all the receivers 22 with the predetermined timing delays to calculate a 3D cubic aggregate result for showing a probability of the at least one moving object existing in the 3D surrounding space.

In one embodiment, M*N values may be outputted by all the matched filters 28 of all the receivers 22 to form the grids of a planar aggregate result, M*N values with the predetermined timing delays outputted by all the matched filters 28 of all the receivers 22 can form all the grids of the 3D cubic aggregate result. Thus, values in the 3D cubic aggregate result may be used for showing an existence probability of the at least one moving object in space, and for being observed.

The MIMO radar device 100 for scanning at least one moving object in the 3D surrounding space and the method for method for scanning at least one moving object in the 3D surrounding space using the random sequency MIMO radar array including a plurality of transmitters 12 for transmitting electromagnetic wave signals to the at least one moving object in space, and a plurality of receivers 22 for receiving the electromagnetic wave signals reflected by the at least one moving object. Each of the plurality of the receivers 22 includes a plurality of matched filters 28 corresponding to the plurality of transmitters 12, each of the matched filters 28 of each of the receivers 22 obtains the electromagnetic wave signals with the predetermined timing delays from a corresponding transmitter 12 and outputting values, the processor 30 accumulates the value outputted by each of the matched filters 28 of each of the receivers 22 and calculating a 3D cubic aggregate result for showing an existence probability of the at least one moving object in space, which is precise and high resolution.

A non-transitory computer-readable storage medium including program instructions for causing the apparatus to perform the method for scanning at least one moving object in space is also disclosed.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. A multiple-input multiple-output (MIMO) radar device for scanning at least one moving object and estimating a probability of the at least one moving object existing in a 3D surrounding space, the multiple-input multiple-output radar device comprising:
    a plurality of transmitters, the plurality of transmitters transmitting electromagnetic wave signals with predetermined timing delays in the 3D surrounding space, the electromagnetic wave signals modulated with unique random sequences transmitted by the plurality of transmitters;
    a plurality of receivers, the plurality of receivers receiving the electromagnetic wave signals reflected by the at least one moving object in the 3D surrounding space, each of the plurality of the receivers comprising a plurality of matched filters corresponding to the plurality of transmitters, wherein each of the plurality of matched filters is configured to obtain the electromagnetic wave signals with the predetermined timing delays from a corresponding transmitter and output values, each of the plurality of matched filters of each of the plurality of receivers is configured to obtain the electromagnetic wave signals with the unique random sequences from the corresponding transmitter and filter the electromagnetic wave signals from other transmitters of the plurality of transmitters and output the values, each of the plurality of receivers comprises an intentional unmatched filter unmatched to the unique random sequences of each of the plurality of transmitters, the intentional unmatched filter of each of the plurality of receivers is configured to integrate an aggregated noise and interference level of the each of the plurality of receivers respectively; and
    a processor, the processor aggregating the values outputted by each of the plurality of matched filters of each of the plurality of receivers and calculating the probability of the at least one moving object existing in the 3D surrounding space, and the processor calculating the weight of the at least one moving object existing in the 3D surrounding space, wherein the weight calculated is inversely proportional to the aggregated noise and interference level of the each of the plurality of receivers.

2. The multiple-input multiple-output radar device according to claim 1, wherein each of the plurality of transmitters comprises a random sequence generator, the random sequence generator is configured to generate baseband signals with the unique random sequences, each of the unique random sequences is uncorrelated.

3. The multiple-input multiple-output radar device according to claim 1, wherein each of the plurality of transmitters further comprises a pulse shaping filter, a frequency up converter, a power amplifier, and a transmitting antenna, wherein the pulse shaping filter is configured to shape the baseband signals with the unique random sequences generated by the random sequence generator and obtain shaped signals within a predetermined bandwidth;
    the frequency up converter is configured to modulate a carrier frequency of the shaped baseband signals to obtain conversed signals within a desired radio frequency (RF) band;
    the power amplifier is configured to amplify the conversed signals and generate the electromagnetic wave signals for being transmitted; and
    the transmitting antenna is configured to transmit the electromagnetic wave signals.

4. The multiple-input multiple-output radar device according to claim 1, wherein each of the plurality of receivers further comprises a receiving antenna, and a low noise amplifier (LNA);
    the receiving antenna is configured to receive the electromagnetic wave signals reflected by the at least one moving object; and
    the LNA is configured to amplify the electromagnetic wave signals.

5. The multiple-input multiple-output radar device according to claim 1, wherein the plurality of transmitters and the plurality of receivers are both antenna arrays.

6. The multiple-input multiple-output radar device according to claim 1, wherein a number of the matched filters in each of the plurality of receivers is equal to a number of the transmitters;
    each of the plurality of receivers outputs at least a number of values by the number of the matched filters corresponding to the number of the transmitters;
    the processor is configured to accumulate the number of values outputted by the plurality of receivers and calculate the probability of moving object in existence for each 3D cube in the 3D surrounding space.

7. The multiple-input multiple-output radar device according to claim 6, wherein the 3D surrounding space is divided into a plurality of 3D cubes according to distance, vertical angle, and horizontal angle; the 3D cubes comprise values outputted by the plurality of matched filters.

8. The multiple-input multiple-output radar device according to claim 1, wherein each of the matched filters of each of the plurality of receivers is an integrator, the plurality of transmitters and the plurality of receivers are microwave radars, the electromagnetic wave signals are microwave signals generated and transmitted by the microwave radars.

9. A method for scanning at least one moving object and estimating probability of the at least one moving object existing in a 3D surrounding space using a multiple-input-multiple-output (MIMO) radar device, the MIMO radar device having a plurality of transmitters and receivers, the method comprising:
   transmitting electromagnetic wave signals with predetermined timing delays in the 3D surrounding space by the plurality of transmitters, the electromagnetic wave signals modulated with unique random sequences transmitted by the plurality of transmitters;
   receiving the electromagnetic wave signals reflected by the at least one moving object in the 3D surrounding space by the plurality of receivers, each of the plurality of receivers comprising a plurality of matched filters corresponding to the plurality of transmitters;
   obtaining the electromagnetic wave signals with the predetermined timing delays from a corresponding transmitter of the plurality of transmitters and outputting values, obtaining the electromagnetic wave signals with the unique random sequences from the corresponding transmitter and filtering the electromagnetic wave signals from other transmitters of the plurality of transmitters, and outputting the values, wherein each of the plurality of receivers comprises an intentional unmatched filter unmatched to the unique random sequences of each of the plurality of transmitters;
   aggregating the values outputted by each of the plurality of matched filters of each of the plurality of receivers and calculating the probability of the at least one moving object existing in the 3D surrounding space; and
   integrating an aggregated noise and interference level of each of the plurality of receivers respectively by the intentional unmatched filter of the each of the plurality of receivers, and calculating the weight of the at least one moving object existing in the 3D surrounding space, wherein the weight calculated is inversely proportional to the aggregated noise and interference level of the each of the plurality of receivers.

10. The method according to claim 9, wherein each of the plurality of transmitters comprises a random sequence generator, the method further comprises generating baseband signals with the unique random sequences by the random sequence generator, each of the unique random sequences is uncorrelated.

11. The method according to claim 9, wherein each of the plurality of transmitters further comprises a pulse shaping filter, a frequency up converter, a power amplifier, and a transmitting antenna;
   the method further comprises
   shaping the baseband signals with the unique random sequences generated by the random sequence generator and obtaining shaped baseband signals within a predetermined bandwidth by the pulse shaping filter;
   modulating a carrier frequency of the shaped baseband signals to obtain conversed signals within a desired radio frequency (RF) band by the frequency up converter;
   amplifying the conversed signals and generating the electromagnetic wave signals for being transmitted by the power amplifier; and
   transmitting the electromagnetic wave signals by the transmitting antenna.

12. The method according to claim 9, wherein each of the plurality of receivers further comprises a receiving antenna and a low noise amplifier (LNA);
   the method further comprises:
   receiving the electromagnetic wave signals reflected by the at least one moving object by the receiving antenna; and
   amplifying the electromagnetic wave signals by the LNA.

13. The method according to claim 9, wherein the plurality of transmitters and the plurality of receivers are both antenna arrays.

14. The method according to claim 9, wherein a number of the matched filters in each of the plurality of receivers is equal to a number of the transmitters;
   the method further comprises:
   outputting at least a number of values by the number of the matched filters corresponding to the number of the plurality of transmitters;
   accumulating the number of values outputted by the plurality of receivers and calculating the probability of the moving object in existence for each 3D in the 3D surrounding space.

15. The method according to claim 14, wherein the 3D surrounding space is divided into a plurality of 3D cubes according to distance, vertical angle, and horizontal angle; the 3D cubes comprises values outputted by the plurality of matched filters.

16. The method according to claim 9, wherein each of the matched filters of each of the plurality of receivers is an integrator, the plurality of transmitters and the plurality of receivers are microwave radars, the electromagnetic wave signals are microwave signals generated and transmitted by the microwave radars.

* * * * *